US010380951B2

(12) United States Patent
Zhang et al.

(10) Patent No.: US 10,380,951 B2
(45) Date of Patent: Aug. 13, 2019

(54) ELECTRONIC DEVICE FOR ADJUSTING BACKLIGHT BRIGHTNESS OF INPUT AREAS AND METHOD THEREOF

(71) Applicant: Lenovo (Beijing) Co., Ltd., Beijing (CN)

(72) Inventors: Shuxian Zhang, Beijing (CN); Yue Wang, Beijing (CN); Zhaolin Teng, Beijing (CN); Shan Qiao, Beijing (CN); Zhilu Yin, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 2 days.

(21) Appl. No.: 15/469,979

(22) Filed: Mar. 27, 2017

(65) Prior Publication Data

US 2017/0345380 A1    Nov. 30, 2017

(30) Foreign Application Priority Data

May 31, 2016    (CN) .......................... 2016 1 0379404
Jun. 7, 2016    (CN) .......................... 2016 1 0399373

(51) Int. Cl.
| | |
|---|---|
| *G09G 3/34* | (2006.01) |
| *G06F 3/0484* | (2013.01) |
| *G06F 3/02* | (2006.01) |
| *G06F 3/0489* | (2013.01) |
| *G06F 3/0488* | (2013.01) |

(52) U.S. Cl.
CPC ............ *G09G 3/3406* (2013.01); *G06F 3/02* (2013.01); *G06F 3/0488* (2013.01); *G06F 3/04847* (2013.01); *G06F 3/04897* (2013.01); *G09G 2320/0626* (2013.01); *G09G 2354/00* (2013.01)

(58) Field of Classification Search
CPC ..................................................... G09G 3/3406
USPC ........................................................... 345/102
See application file for complete search history.

(56) References Cited

U.S. PATENT DOCUMENTS

| | | | |
|---|---|---|---|
| 9,147,378 B2 | 9/2015 | Shekey | |
| 2008/0165203 A1 | 7/2008 | Pantfoerder | |
| 2010/0117927 A1 | 5/2010 | Amagami et al. | |
| 2011/0018743 A1* | 1/2011 | Matsuzawa ........... | G06F 3/0202 341/22 |
| 2014/0292799 A1 | 10/2014 | Shekey | |
| 2015/0046823 A1 | 2/2015 | Didomenico et al. | |
| 2015/0351192 A1 | 12/2015 | Newton et al. | |
| 2016/0196936 A1* | 7/2016 | Ding .................... | G06F 1/1632 361/679.09 |

(Continued)

FOREIGN PATENT DOCUMENTS

| | | |
|---|---|---|
| CN | 1798395 A | 7/2006 |
| CN | 1878190 A | 12/2006 |

(Continued)

*Primary Examiner* — Long D Pham
(74) *Attorney, Agent, or Firm* — Anova Law Group, PLLC

(57) ABSTRACT

A backlight control method and an electronic device are provided. The backlight control method, comprises: determining an input state of an electronic device; and adjusting a backlight brightness parameter of an input area of the electronic device according to the input state of the electronic device, wherein the backlight brightness parameter of the input area of the electronic device is adjusted from a plurality of backlight luminance values that indicate a plurality of backlight brightness levels of the input area.

18 Claims, 5 Drawing Sheets

(56) References Cited

U.S. PATENT DOCUMENTS

2017/0263208 A1\* 9/2017 Imai ........................ G09G 5/10

FOREIGN PATENT DOCUMENTS

| CN | 101346755 A | 1/2009 |
|----|-------------|--------|
| CN | 101719944 A | 6/2010 |
| CN | 102137178 A | 7/2011 |
| CN | 102300004 A | 12/2011 |
| CN | 103869926 A | 6/2014 |
| CN | 104076919 A | 10/2014 |
| CN | 104540289 A | 4/2015 |
| CN | 105138268 A | 12/2015 |
| CN | 105139827 A | 12/2015 |
| CN | 105260167 A | 1/2016 |
| CN | 105630131 A | 6/2016 |
| WO | 2016022002 A1 | 2/2016 |

\* cited by examiner

ELECTRONIC DEVICE FOR ADJUSTING BACKLIGHT BRIGHTNESS OF INPUT AREAS AND METHOD THEREOF

CROSS-REFERENCES TO RELATED APPLICATIONS

This application claims the priorities of Chinese patent application No. 201610379404.5, filed on May 31, 2016, and Chinese patent application No. 201610399373.X, filed on Jun. 7, 2016, the entire content of all of which is incorporated herein by reference.

FIELD OF THE DISCLOSURE

The present disclosure relates to the field of electronic technology and, more particularly, to a backlight control method and an electronic device.

BACKGROUND

Many existing portable electronic devices typically include only one display screen, or include one display screen and one keyboard. With the development of electronic equipment technology, a new type of electronic product having a secondary screen has been on the market. The secondary screen can be integrated with a touchpad, a handwritten electromagnetic screen, a pen write switch, or other functional modules for facilitating user input operations. When the secondary screen is in a non-working state, it can also be used as a plate or a decoration component.

One or more keys can be configured on the secondary screen. Alternatively, when the electronic device is powered on, one or more keys can be displayed on the secondary screen. In other words, when a backlight of the secondary screen is on, the one or more keys can be visible, and when backlight of the secondary screen is off, the one or more keys can be invisible.

However, according to the present disclosure, in order to save the power composition of the electronic equipment, the backlight brightness of the secondary screen may need to be adjusted based on various working states of the secondary screen. Therefore, it is desired to provide a strategy for automatically controlling the backlight brightness for the secondary screen.

The disclosed backlight control method and electronic device are directed to solve one or more problems in the art.

BRIEF SUMMARY OF THE DISCLOSURE

In accordance with some embodiments of the disclosed subject matter, a backlight control method and an electronic device are provided.

One aspect of the present disclosure provides a backlight control method. The backlight control method comprises: determining an input state of an electronic device; and adjusting a backlight brightness parameter of an input area of the electronic device according to the input state of the electronic device, wherein the backlight brightness parameter of the input area of the electronic device is adjusted from a plurality of backlight luminance values that indicate a plurality of backlight brightness levels of the input area.

In some embodiments, the input area and a display screen of the electronic device are located at different regions of the electronic device.

In some embodiments, the input area includes a keyboard; and the backlight brightness parameter indicates a backlight brightness level of at least one key mark on the keyboard of the electronic device.

In some embodiments, the input state includes at least one of an inputting state, an input-waiting state, and a non-inputting state; the inputting state indicates that the input area is receiving input information through a clicking operation or a handwriting operation; the input-waiting state indicates that the input area is waiting for input information; the non-inputting state indicates that the input area does not respond to a clicking operation or a handwriting operation through the input area; a backlight brightness level corresponding to the inputting state is not less than a backlight brightness level corresponding to the input-waiting state; and a backlight brightness level corresponding to the non-inputting state is less than the backlight brightness level corresponding to the input-waiting state and the backlight brightness level corresponding to the inputting state.

In some embodiments, in response to not receiving an input during a first time-range, the electronic device switches from the inputting state to the input-waiting state; and in response to not receiving an input during a second time-range, or in response to receiving a preset operation, the electronic device switches from the input-waiting state to the non-inputting state.

In some embodiments, adjusting the backlight brightness parameter of the input area of the electronic device according to the input state includes: in response to determining the input state is a first input state, adjusting the backlight brightness parameter of the input area to a first backlight luminance value corresponding to the first input state, wherein the input area in the first input state responses to a clicking operation within the input area; and in response to determining the input state is a second input state, adjusting the backlight brightness parameter of the input area to a second backlight luminance value corresponding to the second input state, wherein the input area in the second input state responses to a handwriting operation within the input area.

In some embodiments, the backlight control method further comprises:
in response to detecting an adjustment operation to a first backlight brightness parameter,
adjusting the first backlight brightness parameter based on the adjustment operation;
and adjusting a second backlight brightness parameter based on the adjustment of the first backlight brightness parameter, wherein the first backlight brightness parameter and the second backlight brightness parameter correspond to different input states respectively.

In some embodiments, the first backlight brightness parameter indicates a first backlight brightness level of the electronic device in a first input state; the second backlight brightness parameter indicates a second backlight brightness level of the electronic device in a second input state; and a power consumption of the electronic device in the first input state is different from a power consumption of the electronic device in the second input state.

In some embodiments, the backlight control method further comprises:
determining a backlight brightness level of a display screen of the electronic device;
and determining a backlight brightness level of the input area of the electronic device;

wherein the input area and the display screen of the electronic device are located at different regions of the of the electronic device.

In some embodiments, the backlight control method further comprises: displaying a backlight brightness adjustment interface; wherein the backlight brightness adjustment interface includes at least a first adjustment bar corresponding to the first backlight brightness parameter and a second adjustment bar corresponding to the second backlight brightness parameter, adjustment to the first backlight brightness parameter being realized by a dragging operation of a mark on the first adjustment bar, and adjustment to the second backlight brightness parameter being realized by a dragging operation of a mark on the second adjustment bar.

Another aspect of the present disclosure provides an electronic device, comprising: an input component and a display screen, the input component and the display screen of being located at different regions of the of the electronic device; and a processor coupled to the input component and the display screen, wherein the processor determines an input state of an electronic device, and adjusts a backlight brightness parameter of an input area of the electronic device according to the input state, wherein the backlight brightness parameter of the input area of the electronic device is adjusted from a plurality of backlight luminance values that indicate a plurality of backlight brightness levels of the input area.

In some embodiments, the input component includes at least one of a keyboard, a touchpad, and an external input device detachable from the electronic device.

In some embodiments, the input component includes a keyboard, and the backlight brightness parameter indicates a backlight brightness level of at least one key mark on the keyboard of the electronic device.

In some embodiments, the input component supports keyboard input and handwriting input by hand or accessory.

In some embodiments, the input state includes at least one of an inputting state, an input-waiting state, and a non-inputting state; the inputting state indicates that the input component is receiving input information through a clicking operation or a handwriting operation; the input-waiting state indicates that the input component is waiting for input information; the non-inputting state indicates that the input component does not respond to a clicking operation or a handwriting operation through the input area; a backlight brightness level corresponding to the inputting state is not less than a backlight brightness level corresponding to the input-waiting state; and a backlight brightness level corresponding to the non-inputting state is less than the backlight brightness level corresponding to the input-waiting state and the backlight brightness level corresponding to the inputting state.

In some embodiments, the processor further: in response to determining the input state is a first input state, adjusts the backlight brightness parameter of the input area to a first backlight luminance value corresponding to the first input state, wherein the input area in the first input state responses to a clicking operation within the input area; and in response to determining the input state is a second input state, adjusts the backlight brightness parameter of the input area to a second backlight luminance value corresponding to the second input state, wherein the input area in the second input state responses to a handwriting operation within the input area.

In some embodiments, the processor further in response to detecting an adjustment operation to a first backlight brightness parameter, adjusts the first backlight brightness parameter based on the adjustment operation; and adjusts a second backlight brightness parameter based on the adjustment of the first backlight brightness parameter; wherein the first backlight brightness parameter and the second backlight brightness parameter correspond to different input states respectively.

In some embodiments, the first backlight brightness parameter indicates a first backlight brightness level of the electronic device in a first input state; the second backlight brightness parameter indicates a second backlight brightness level of the electronic device in a second input state; and a power consumption of the electronic device in the first input state is different from a power consumption of the electronic device in the second input state.

In some embodiments, the processor further: determines a backlight brightness level of the display screen of the electronic device; and determines a backlight brightness level of the input component of the electronic device.

In some embodiments, the processor further determines the input state according to a relative positional relationship between the input component and the display screen of the electronic device.

Other aspects of the disclosed subject matter can be understood by those skilled in the art in light of the description, the claims, and the drawings of the present disclosure.

BRIEF DESCRIPTION OF THE DRAWINGS

Various objectives, features, and advantages of the present disclosure can be more fully appreciated with reference to the detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Reference will now be made in detail to certain embodiments of the disclosure, which are illustrated in the accompanying drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

In accordance with various embodiments, the present disclosure provides a backlight control method and an electronic device for automatically control the backlight brightness of a secondary display.

In the disclosed method, a state of the electronic device can be determined first, and the backlight brightness of the electronic device can be adjusted corresponding to the state of the electronic device. As such, the backlight brightness can be automatically adjusted according to the state of the electronic device. Therefore, the applicability of the electronic device can be improved, and the user experience can be enhanced.

The various embodiments of the disclosed backlight control method described below can be applied on any appropriate electronic device. The electronic device can be any suitable electronic device including, but not limited to, a notebook computer, a mobile phone, a tablet computer, and the like.

The term "and/or" can be simply a description of an association between objects, indicating that there may be three relationships between two objects. For example, "A and/or B" may indicates the following three possibilities: A exists alone, B exists alone, and both of A and B exist. In addition, the symbol "/" may generally indicate an "or" relationship between objects.

In the various embodiments of the disclosed backlight control method and the disclosed electronic device described below, the relationship between a first brightness parameter of the first backlight brightness and a second brightness parameter of the second backlight brightness may be determined by a large number of experimental data, or initiatively provided by a user. The first backlight brightness characterizes a backlight brightness level when the electronic device is in a first state, and the second backlight brightness characterizes a backlight brightness level when the electronic device is in a second state. The power consumption of the electronic device in the first state and the power consumption of the electronic device the second state can be different.

Figure 1:
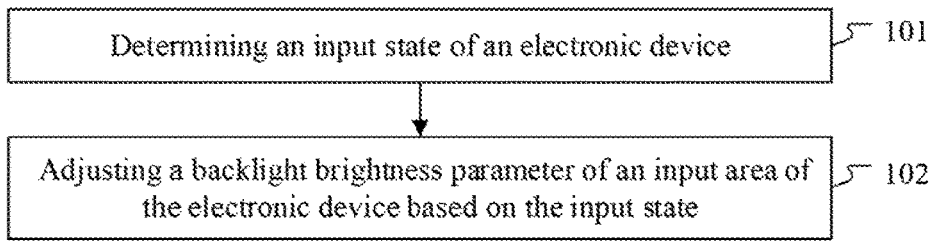
FIG. 1 illustrates a schematic flow diagram of a backlight control method in accordance with some embodiments of the present disclosure.

Referring to FIG. 1, a schematic flow diagram of a backlight control method is shown in accordance with some embodiments of the present disclosure. The backlight control method can be applied to an electronic device. As illustrated, the backlight control method can include the following steps.

At step 101, an input state of the electronic device can be determined.

At step 102, a backlight brightness parameter of an input area of the electronic device can be adjusted based on the input state. The input area of the electronic device can have different backlight brightness levels.

Figure 2:
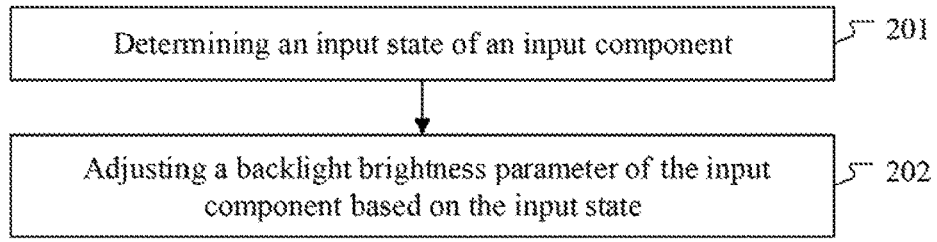
FIG. 2 illustrates a schematic flow diagram of another backlight control method in accordance with some other embodiments of the present disclosure.

Referring to FIG. 2, a schematic flow diagram of another backlight control method is shown in accordance with some other embodiments of the present disclosure. The backlight control method can be applied to an electronic device including an input component. An input state of the electronic device can be an input state of the input component. As illustrated, the backlight control method can include the following steps.

At step 201, an input state of the input component can be determined.

The input component may be any suitable input device/unit/apparatus, such as a secondary touch screen, a keyboard, a handle, a handwriting input unit, etc. The input component may be connected to the electronic device, or integrated with the electronic device, or coupled with the electronic device such that a user can operate the input component to input information to the electronic device.

In some implementations, the input component may be in a variety of operating modes. For example, the input component may be in a keyboard operating mode that can allow the user to enter information through clicking operations, the input component may be in a voice operating mode that can allow the user to enter information through voice, the input component may be in a handwriting mode that can allow the user to enter information by handwriting, or the input component may be in a non-operational state mode that does not respond to any input operation. In various actual implementations, the operating modes of the input component can be set according to actual needs.

In some embodiments, the variety of operating modes can be categorized into three input states, which are described in details below.

At step 202, a backlight brightness parameter of the input component can be adjusted based on the input state.

That is, the input component of the electronic device can have different backlight brightness levels. According to the input state, the input component can be adjusted to have a corresponding backlight brightness level.

In some embodiments, the input state of the input component of the electronic device can be determined first, and the backlight brightness of the input component can be adjusted corresponding to the input state of the input component. As such, the backlight brightness of the input component can be automatically adjusted according to the input state of the input component. Therefore, the applicability of the electronic device can be improved, and the user's experience can be enhanced.

Optionally, the input state can include an inputting state, an input-waiting state, and a non-inputting state.

The inputting state may refer to a state that the input component is receiving input information. That is, the user is inputting information through the input component. The input-waiting state may refer to a state that no input is received by the input component during a time period after receiving an input from the user. The non-inputting state may refer to a state that the input component cannot accept any user input. That is, the user cannot input information through the input component.

For example, the input component can be a device integrating a voice input function, a keyboard input function, and a handwriting input function. When the user is able to input information using any of a voice input operation, a keyboard input operation, or a handwriting input operation by the input component, the input component may be determined to be in the inputting state. When the user cannot input information using any voice input operation, keyboard input operation, or handwriting input operation, the input component may be determined to be in the non-inputting state.

In some embodiments, determining an input state of the input component at step 201 can include the following processes.

In response to detecting a clicking operation or a handwriting operation to the input component, the input component can be determined in an inputting state.

In response to determining that the electronic device is in an input-waiting state, the input component can be determined in an input-waiting state. When the electronic device is in the input-waiting state, a focus point of a display interface of the electronic device can be in an input acceptable area. The input acceptable area can be used to display input information.

In response to determining that the input component is not responsible to a clicking operation or a handwriting operation, the input component can be determined in a non-inputting state.

In some embodiments, the clicking operation may be a keyboard-type clicking or a game controller-type clicking. A user may operate the electronic device by clicking keys of a keyboard to input information, or clicking buttons of a game controller to input information.

In some embodiments, the handwriting operation may be, for example, a writing by a fingertip or an electronic pen on the input component of the electronic device to input information.

That is, the input component may integrate a clicking operation function and a handwriting input function. When the input component is adjusted to be in the inputting state, the input component can accept a user input by receiving a clicking operation or a handwriting operation.

When the input component is in a non-inputting state, the input component is not responsible to a clicking operation or a handwriting operation. That is, in some embodiments, the input component is irresponsive to a clicking operation, and the input component is also irresponsive to a handwriting operation. However, the input component may still be able to respond to information entered by the user based on other functional settings. For example, when the input component is in the non-inputting state, a user may click a functional switch button provided on one side of the input component to switch the input component from the non-inputting state to the inputting state. For another example, when the input component is in the non-inputting state, a user may press a preset combination of keys to turn off the system power supply of the electronic device, or to perform any other suitable functions.

That is, when the input component is in the non-inputting state, the input component is not completely irresponsive to any input operation, but just to the clicking operation as well as the handwriting operation based on the input component.

In some embodiments, when a focus point of a display interface of the electronic device is in an input acceptable area, there are at least two possibilities.

In one case, a cursor in the display interface of the electronic device can be in an input acceptable area. For example, a cursor is in a document editing interface of a document editing application. As another example, a cursor is in a webpage address bar of a browser application.

In another case, the display interface of the electronic device can be automatically switched to an input acceptable area, and only the input acceptable area can be operated.

It should be noted that, the input acceptable area can be any suitable area in the display interface of the electronic device where a character input, a graphical input, or any other form of signal input may be accepted.

In some embodiments, when a focus point of a display interface of the electronic device is in an input acceptable area, a character input, a graphical input, or any other form of signal input may be potentially received from the input component. As such, it can be automatically determined that the input component is in the input-waiting state, thereby facilitating a user to perform an information input operation by the input component.

Accordingly, in some embodiments, the disclosed the input component may have an inputting state for responding to a clicking operation or a handwriting operation to receive input information, an non-inputting state for ignoring a clicking operation and a handwriting operation to block input information, and an input-waiting state for waiting a character input, a graphical input, or any other form of signal input to the electronic device. As such, the applicability of the input component can be improved, and the intelligent parameter of electronic device can be enhanced.

In some embodiments, adjusting the backlight brightness of the input component based on the input state at step 202 can include the following processes.

In response to determining that the input component is in an inputting state, the backlight brightness of the input component can be adjusted to an inputting brightness corresponding to the inputting state.

In response to determining that the input component is in a non-inputting state, the backlight brightness of the input component can be adjusted to a non-inputting brightness corresponding to the non-inputting state.

In some embodiments, a luminance value of the inputting brightness can be larger than a luminance value of the non-inputting brightness.

That is, the input component can have a higher backlight luminance in the inputting state comparing to in the non-inputting state.

When the input component is in the inputting state, the user may be performing an information input operation through the input component, having a higher backlight luminance may facilitate the information input operation of the user. When the input component is in the non-inputting state, it is highly likely that the user is not performing an information input operation through the input component, having a lower backlight luminance or directly turning off the backlight of the input component may be advantageous for saving the energy consumption of the electronic device. Therefore, the disclosed method can improve the applicability of the electronic device, and can save energy as well.

In some embodiments, adjusting the backlight brightness of the input component to an inputting brightness corresponding to the inputting state can include the following processes.

In response to determining that the input component is in a first inputting state, the backlight brightness of the input component can be adjusted to a first brightness corresponding to the first inputting state.

In response to determining that the input component is in a second inputting state, the backlight brightness of the input component can be adjusted to a second brightness corresponding to the second inputting state.

In some embodiments, the first inputting state is a clicking-receiving state, the second inputting state is a handwriting-receiving state, a luminance value of the first brightness can be equal to or larger than a luminance value of the second brightness.

That is, the inputting state of the input component can include a first inputting state for accepting a clicking operation, and a second inputting state for accepting a handwriting operation. The input component may have a higher backlight luminance in the first inputting state comparing to in the second inputting state.

That is, when the input component activates a key-clicking operation function, allowing a user to use the electronic device by using a clicking operation on a keyboard or a controller, a luminance value of the backlight brightness of the input component can be equal to or larger than a luminance value of the backlight brightness of the input component when the input component activates a handwriting operation function.

Since a user needs to recognize the keys or characters on the input component during a clicking operation, it is helpful to use a strong backlight brightness when the input device is in a clicking-receiving state when the key-clicking operation function is activated. Therefore, the disclosed method in some embodiments can further improve the applicability of the electronic device, and enhance the user experience.

In some embodiments, determining the input component is in an inputting state can include the following processes.

In response to receiving a user input operation through the input component within a first preset time range, the input component can be determined in the inputting state.

In response to not receiving a user input operation through the input component within a second preset time range, the input component can be determined in a standby state.

In some embodiments, adjusting the backlight brightness of the input component to an inputting brightness corresponding to the inputting state can include the following processes.

In response to determining the input component is in the inputting state, the backlight brightness of the input component can be adjusted to a working brightness corresponding to the inputting state.

In response to determining the input component is in the standby state, the backlight brightness of the input component can be adjusted to a standby brightness corresponding to the standby state.

In some embodiments, a luminance value of the working brightness can be larger than a luminance value of the standby brightness.

That is, when the duration of the standby state is less than a preset time length, it is possible to characterize that the user is currently using the input component for information input in which the backlight brightness of the input component can be set to be a working brightness corresponding to the inputting state.

When the duration of the standby state is larger than or equal to a preset time length, it is possible to characterize that the user does not used the input component for information input. When the duration of the standby state has exceeded a threshold value, the backlight brightness of the input component can be set to the standby brightness corresponding to the standby state in which the user does not perform input operation to input information temporarily.

The luminance value of the working brightness can be larger than the luminance value of the standby brightness value, such that the energy consumption of the electronic device can be effectively saved without affecting the user's operation.

It should be noted that, in some actual implementations, when the input component continues to be in the standby state for a further longer time than the preset time range, it is possible to characterize that the user has not used the input component for a long time. In that case, for further reducing the energy consumption of the electronic device, the electronic device may turn off the input component, or issue a prompt message to alert the user to turn off the electronic device.

Therefore, in some embodiments of the disclosed method, a backlight brightness parameter of the input component can be adjusted to have a larger luminance value when the user is inputting information through the input component, and a backlight brightness parameter of the input component can be adjusted to have a smaller luminance value when the user is not inputting information through the input component temporally. Therefore, the energy consumption of the electronic device can be further reduced.

Optionally, prior to determining the input state of the input component, the method can further include the following steps.

It can be detected whether a display screen of the electronic device is in a displaying state. In response to determining that the display screen of the electronic device is in the displaying state, the input state of the input component can be determined. In response to determining that the display screen of the electronic device is not in the displaying state, the backlight brightness of the input component can be adjusted to a turned-off state.

In some actual implementations, when the display screen of the electronic device is in the displaying state, the user can normally know the content of the information inputted through the input component, or can acknowledge that the electronic device is in an operating state. Therefore, when the display of the electronic device is in the displaying state, the disclosed method can be effectively performed to save the system resources and improve the processing efficiency of the electronic device.

On the other hand, when the display screen of the electronic device is not in the displaying state, the electronic device can be normally in a turned-off state or in a standby state. Thus, the backlight of the input component can be turned off when the display screen of the electronic device is not in the displaying state, thereby further saving the system energy consumption.

Therefore, in some embodiment of the disclosed method, when the display screen of the electronic device is in the displaying state, the backlight of the input component can be adjusted according to the disclosed method. When the display screen of the electronic device is not in the displaying state, the backlight of the input component can be turned off. Therefore, the system resources can be saved, the processing efficiency of the electronic device can be improved, and the energy consumption of the system can be further reduced.

Accordingly, the disclosed method described above can have the following technical effects or advantages.

In some embodiments, the disclosed input component may have an inputting state for responding to a clicking operation or a handwriting operation to receive input information, an non-inputting state for ignoring a clicking operation and a handwriting operation to block input information, and an input-waiting state for waiting a character input, a graphical input, or any other form of signal input to the electronic device. As such, the applicability of the input component can be improved, and the intelligent parameter of electronic device can be enhanced.

When the input component is in the inputting state, the user is highly likely being performing an information input operation through the input component, having a higher backlight luminance may facilitate the information input operation of the user. When the input component is in the non-inputting state, it is highly likely that the user is not performing an information input operation through the input component, having a lower backlight luminance or directly turning off the backlight of the input component may be advantageous for saving the energy consumption of the electronic device. Therefore, the disclosed method can improve the applicability of the electronic device, and can save energy as well.

When a user wants to recognize the keys or characters on the input component during a clicking operation, it is helpful to use a strong backlight brightness when the input device is in a clicking-receiving state. Therefore, the disclosed method can further improve the applicability of the electronic device, and enhance the user experience.

In some embodiments, a backlight brightness level of the input component can be adjusted to have a larger luminance value when the user is inputting information through the input component, and a backlight brightness level of the input component can be adjusted to have a smaller luminance value when the user is not inputting information through the input component temporally. Therefore, the energy consumption of the electronic device can be further reduced.

In some embodiment of the disclosed method, when the display screen of the electronic device is in the displaying state, the backlight of the input component can be adjusted according to the disclosed method. When the display screen of the electronic device is not in the displaying state, the backlight of the input component can be turned off. Therefore, the system resources can be saved, the processing efficiency of the electronic device can be improved, and the energy consumption of the system can be further reduced.

Figure 3:
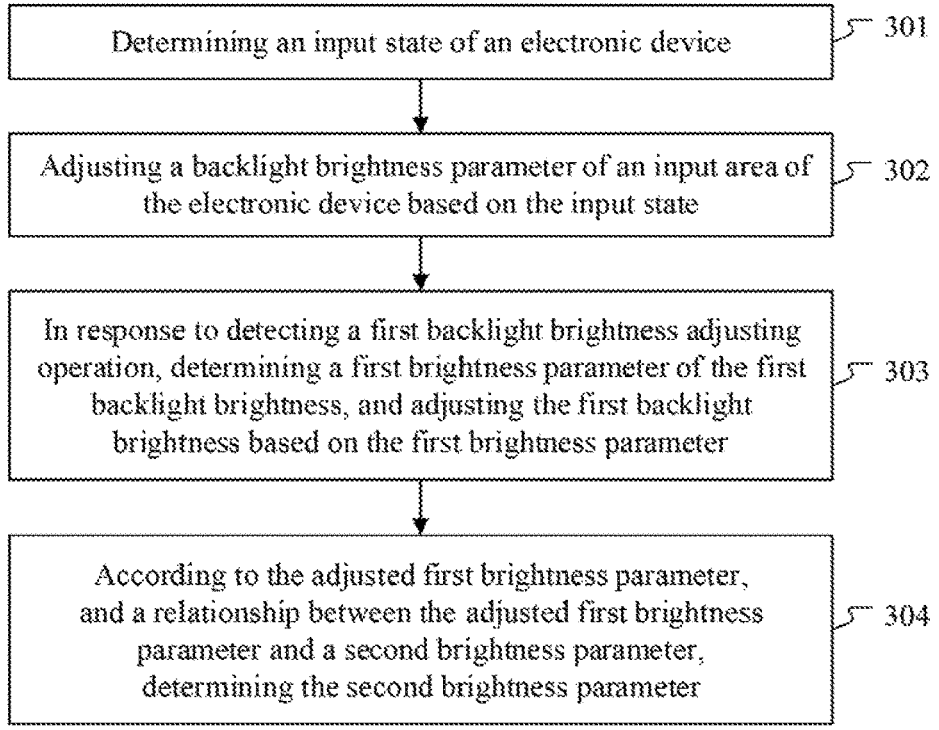
FIG. 3 illustrates a schematic flow diagram of another backlight control method in accordance with some other embodiments of the present disclosure.

Referring to FIG. 3, a schematic flow diagram of another backlight control method is shown in accordance with some other embodiments of the present disclosure. The disclosed backlight control method can be applied to an electronic device. As illustrated, the backlight control method can include the following steps.

At step 301, an input state of the electronic device can be determined.

At step 302, a backlight brightness parameter of an input area of the electronic device can be adjusted based on the input state.

At step 303, in response to detecting a first backlight brightness adjusting operation, a first brightness parameter of the first backlight brightness can be determined, and the first backlight brightness can be adjusted based on the first brightness parameter.

The first backlight brightness adjusting operation can be an operation for adjusting the first backlight brightness of the electronic device. For example, the first backlight brightness adjusting operation may be a mark dragging operation.

In some embodiments, the first backlight brightness characterizes a backlight the brightness when the electronic device is in a first state, and the second backlight brightness characterizes a backlight the brightness when the electronic device is in a second state. A power consumption of the electronic device in the first state can be different than a power consumption of the electronic device in the second state.

The first state and the second state can be selected from the following group:
a working state, and a hibernating state. The hibernating state can include a sleep state.

For example, the first state can be a working state and the second state can be a hibernating state. Alternatively, the first state can be a hibernating state and the second state can be a working state.

Specifically, both of the "hibernating state" and "sleep state" are energy saving states. The sleep state may generally save the current work status and settings in a memory and consume a small amount of power. When a user wants to start work again, the electronic device can quickly be restored to a full power to resume the work. For example, letting the electronic device to enter the sleep state can be like pausing a DVD player. The electronic device may be immediately stop working and prepare for further work. The hibernating state may generally save the opened documents and programs to a hard disk, and then turn off the electronic device.

In some embodiments, prior to step 303, the method may further include the following process.

When a first operation is detected, the electronic device can present a backlight brightness adjustment interface. The first operation can be used for instructing an adjustment of the backlight brightness. The first operation may be a touch operation, a voice operation, or any other suitable operation.

Figure 4:
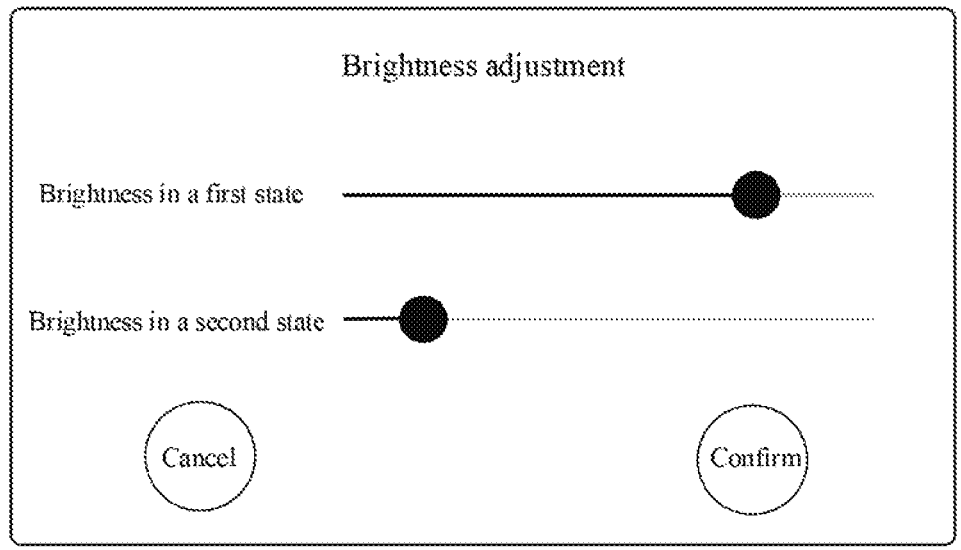
FIG. 4 illustrates a schematic diagram of a backlight brightness adjustment interface in accordance with some embodiments of the present disclosure.

Referring to FIG. 4, a schematic diagram of a backlight brightness adjustment interface is shown in accordance with some embodiments of the present disclosure.

As illustrated, the backlight brightness adjustment interface can include at least a first adjustment bar and a second adjustment bar. The first adjustment bar can correspond to the backlight brightness of the electronic device in the first state, and the second adjustment bar can correspond to the backlight brightness of the electronic device in the second state.

The first backlight brightness can be adjusted by dragging the mark of the first adjustment bar. The second backlight brightness can be adjusted by dragging the mark of the second adjustment bar. The power consumption of the electronic device in the first state can be different from the power consumption of the electronic device in the second state. When a trigger of a determination button is received, the setting parameters of the first backlight brightness and the second backlight brightness can be stored.

Turning back to FIG. 3, at step 304, according to the first brightness parameter of the first backlight brightness, and a relationship between the first brightness parameter of the first backlight brightness and a second brightness parameter of the second backlight brightness, the second brightness parameter of the second backlight brightness can be determined.

For example, the first brightness parameter can indicate the first backlight brightness of the electronic device in the working state, and the second brightness parameter can indicate the second backlight brightness of the electronic device in the hibernating state. When the electronic device detects a backlight brightness adjustment operation in the working state, the first backlight brightness parameter can be determined based on the backlight brightness adjustment operation.

In the same time, a relationship between the currently second brightness parameter for the electronic device in the hibernating state and the determined first backlight brightness parameter for the electronic device in the working state can be determined. It can be determined whether such relationship satisfies a preset relationship between the backlight brightness parameters for the electronic device in the working state and in the hibernating state.

In response to determining that the preset relationship is satisfied, the currently setting of the backlight brightness in the hibernating state can be maintained. In response to determining that the preset relationship is not satisfied, the backlight brightness value in the hibernating state can be determined based on the preset relationship.

As such, a user can merely adjust the backlight brightness in the working state without paying attention to the backlight brightness in the hibernating state. Therefore, the cumbersome process for adjusting both of the backlight brightness in the working state and the backlight brightness in the hibernating state can be simplified.

As an alternative example, the first brightness parameter can indicate the first backlight brightness of the electronic device in the hibernating state, and the second brightness parameter can indicate the second backlight brightness of the electronic device in the working state. When the electronic device detects a backlight brightness adjustment operation in the hibernating state, the first backlight brightness parameter can be determined based on the backlight brightness adjustment operation.

At the same time, a relationship between the currently second brightness parameter for the electronic device in the working state and the determined first backlight brightness parameter for the electronic device in the hibernating state can be determined. It can be determined whether such relationship satisfies a preset relationship between the backlight brightness parameters for the electronic device in the hibernating state and in the working state.

In response to determining that the preset relationship is satisfied, the currently setting of the backlight brightness in the working state can be maintained. In response to determining that the preset relationship is not satisfied, the backlight brightness value in the working state can be determined based on the preset relationship.

As such, a user can merely adjust the backlight brightness in the hibernating state without paying attention to the backlight brightness in the working state. Therefore, the cumbersome process for adjusting both of the backlight brightness in the working state and the backlight brightness in the hibernating state can be simplified.

Optionally, the backlight brightness can be a screen backlight brightness level of the electronic device.

Optionally, the backlight brightness can be a backlight brightness level of the input area of the electronic device.

Optionally, the backlight brightness can be a keyboard backlight brightness level of the electronic device.

It should be noted that, the backlight brightness described herein is not limited to the above described embodiments, but may be any backlight brightness of any other suitable components related to the electronic device.

In some embodiments, the electronic device may be any suitable device having a backlight brightness adjustment function, such as a notebook computer, a tablet computer, a mobile phone, or the like.

Accordingly, in some embodiments of the disclosed method, in response to detecting a first backlight brightness adjusting operation, a first brightness parameter of a first backlight brightness can be determined, and the first backlight brightness can be adjusted based on the first brightness parameter. According to the first brightness parameter of the first backlight brightness, and a relationship between the first brightness parameter of the first backlight brightness and a second brightness parameter of the second backlight brightness, the second brightness parameter of the second backlight brightness can be determined.

As such, the electronic device can automatically adjust the second backlight brightness based on the relationship between the second brightness parameter and the adjusted first brightness parameter, and does not require the user to manually adjust the second backlight brightness. Therefore, the process of adjusting the brightness of the backlight can be simplified, and the convenience to adjust the backlight brightness can be enhanced.

At the same time, since the first backlight brightness and the second backlight brightness respectively represent the backlight brightness of the electronic device in the first state and the second state, the second brightness parameter can be adaptively determined in accordance with the adjustment of the first brightness parameter, which is conducive to reducing the power consumption of electronic device.

For example, one or more keys can be printed on a touchpad of an electronic device. The one or more keys are visible when the backlight is on, and are not visible when the backlight is off. Assuming that the backlight brightness value can be adjustable from 0 to 255. When the backlight brightness value is 0, the touchpad is turned off. When the backlight brightness value is 255, the brightness of the one or more keys on the touchpad reaches the brightest state.

When the touchpad is in use, a certain backlight brightness value is required to ensure that the one or more keys are visible. In order to save power, when the touchpad has not received a clicking operation for a time period, it may need to dim the backlight in a timely manner.

Because different users may have different habits, and may have different requirements to the backlight brightness. Therefore, by using the disclosed method, it is possible to provide a simple and convenient process for adjusting the backlight brightness for the users. Thus, the disclosed method may contribute to the use of such touchpad and even the electronic device.

Figure 5:
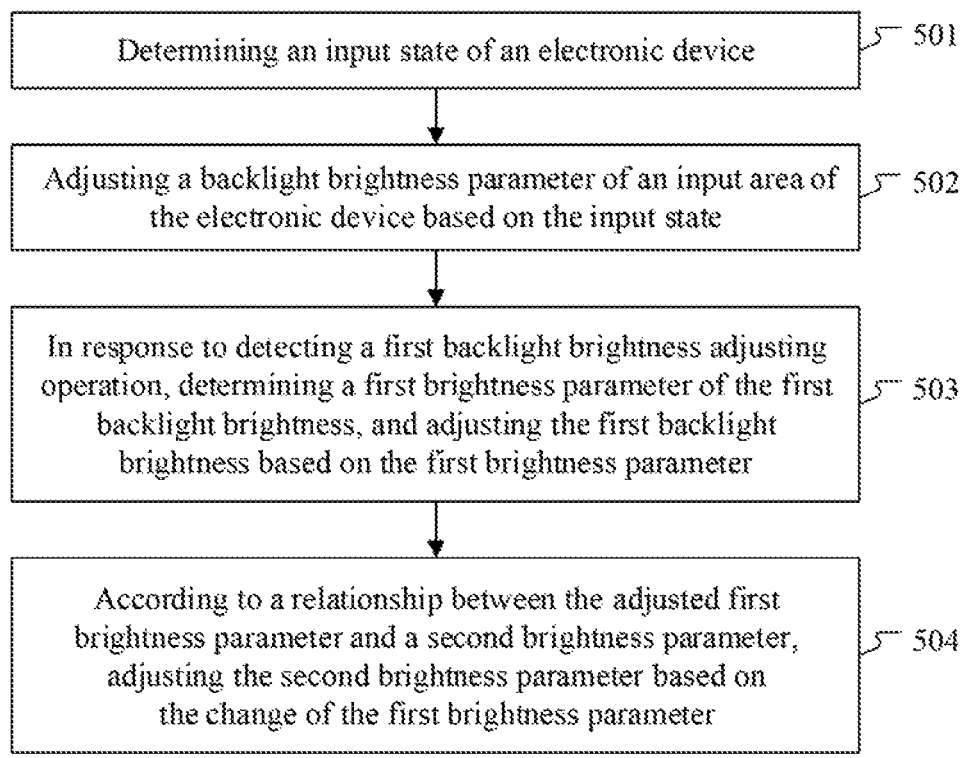
FIG. 5 illustrates a schematic flow diagram of another backlight control method in accordance with some other embodiments of the present disclosure.

Referring to FIG. 5, a schematic flow diagram of another backlight control method is shown in accordance with some other embodiments of the present disclosure. The disclosed backlight control method can be applied to an electronic device. As illustrated, the backlight control method can include the following steps.

At step 501, an input state of the electronic device can be determined.

At step 502, a backlight brightness parameter of an input area of the electronic device can be adjusted based on the input state.

At step 503, in response to detecting a first backlight brightness adjusting operation, a first brightness parameter of a first backlight brightness can be determined, and the first backlight brightness can be adjusted based on the first brightness parameter.

The first backlight brightness adjusting operation can be an operation for adjusting the first backlight brightness of the electronic device. For example, the first backlight brightness adjusting operation may be a mark dragging operation.

In some embodiments, the first backlight brightness characterizes a backlight the brightness when the electronic device is in a first state, and the second backlight brightness characterizes a backlight the brightness when the electronic device is in a second state. A power consumption of the electronic device in the first state can be different than a power consumption of the electronic device in the second state.

The first state and the second state can selected from the following group:
a working state, and a hibernating state. The hibernating state can include a sleep state.

For example, the first state can be a working state and the second state can be a hibernating state. Alternatively, the first state can be a hibernating state and the second state can be a working state.

At step 504, according to the first brightness parameter of the first backlight brightness, and a relationship between the first brightness parameter of the first backlight brightness and a second brightness parameter of the second backlight brightness, the second brightness parameter of the second backlight brightness can be adjusted based on the change of the first brightness parameter.

That is, the backlight brightness in the first state is correlated with the backlight brightness in the second state. The backlight brightness in the second state can be changed following the change of the backlight brightness in the first state.

As such, the user's operation can be simplified, which is conducive to the promotion of backlight brightness adjustment function, and to enhance the convenience and activity for the user to use the backlight brightness adjustment function.

In some particular embodiments, the second brightness parameter of the second backlight brightness can be automatically adjusted in real time following a change of the first brightness parameter of the first backlight brightness. For example, on a backlight brightness adjustment interface, when the mark on the first adjustment bar is dragged, the mark on the second adjustment bar also follows the movement of the mark on the first adjustment bar.

It should be noted that, according to the preset relationship between the first brightness parameter and the second brightness parameter, the movement parameter of the mark of the second adjustment bar may be different from the movement parameter of the mark of the first adjustment bar. The movement parameter may be a moving distance, a moving speed, a moving direction, or the like.

In this way, the adjustment of the first backlight brightness and the adjustment of the second backlight brightness can be more flexible. An adjustment time can be correspondingly shorter, and the user's intuitive feeling for adjusting the backlight brightness can be stronger.

Figure 6:
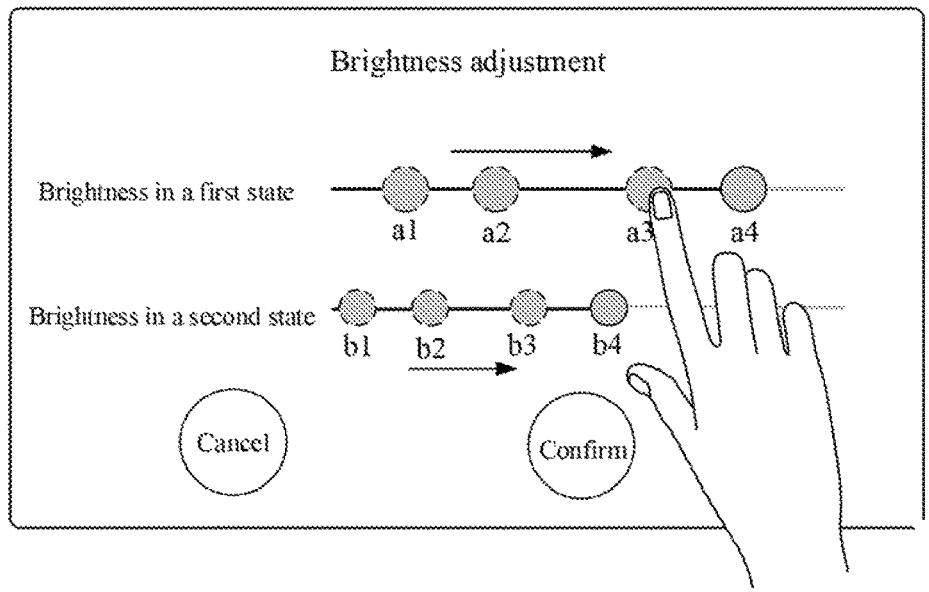
FIG. 6 illustrates a schematic diagram of another backlight brightness adjustment interface in accordance with some other embodiments of the present disclosure.

Referring to FIG. 6, a schematic diagram of another backlight brightness adjustment interface is shown in accordance with some other embodiments of the present disclosure.

As illustrated, the user can drag the mark on the first adjustment bar. The movement of the mark on the first adjustment bar can be divided into three stages. The first stage is from a1 to a2, the second stage is from a2 to a3, and the third stage is from a3 to a4.

When the mark on the first adjustment bar is dragged, the mark of the second adjustment bar may follow the movement of the mark on the first adjustment bar. The movement of the mark on the second adjustment bar can also be divided into three stages. The first stage is from b1 to b2, the second stage is from b2 to b3, and the third stage is from b3 to b4. As such, the user can have an intuitive feeling that the relationship of backlight brightness between the two states.

In some alternatively embodiments, the second brightness parameter of the second backlight brightness can be adjusted in accordance with the first brightness parameter of the first backlight brightness with a delay instead of in real time. Optionally, after the first backlight brightness adjustment is completed, and the second brightness parameter of the second backlight brightness can be adjusted based on the adjusted first brightness parameter of the first backlight brightness.

In some practical embodiments, a specific movement following between the mark of the second adjustment bar and the mark on the first adjustment bar may also depend on the preset relationship between the first brightness parameter and the second brightness parameter.

For example, when the brightness parameter of the first backlight brightness is within an interval, the brightness parameter of the second backlight brightness can be a fixed value. When the brightness parameter of the first backlight brightness is within another interval, the brightness parameter of the second backlight brightness can be another fixed value.

Therefore, when the brightness parameter of the first backlight brightness is adjusted in one of the intervals, it is possible that the brightness parameter of the second backlight brightness keeps a same value. In such cases, the brightness parameter of the second backlight brightness may not be adjusted in real time to follow the change of the brightness parameter of the first backlight brightness.

As another example, in the backlight brightness adjustment interface, when the mark on the first adjustment bar is dragged, the mark on the second adjustment bar may not follow the movement of the mark on the first adjustment bar. Instead, after the position of the mark on the first adjustment bar is fixed, the position of mark on the second adjustment bar can be adjusted based on the first brightness parameter corresponding to the fixed position of the mark on the first adjustment bar.

Optionally, the backlight brightness can be a screen backlight brightness level of the electronic device.

Optionally, the backlight brightness can be a backlight brightness level of the input area of the electronic device.

Optionally, the backlight brightness can be a keyboard backlight brightness level of the electronic device.

It should be noted that, the backlight brightness described herein is not limited to the above described embodiments, but may be any backlight brightness of any other suitable components related to the electronic device.

In some embodiments described above in accordance with FIGS. 5 and 6, in response to detecting a first backlight brightness adjusting operation, a first brightness parameter of a first backlight brightness can be determined, and the first backlight brightness can be adjusted based on the first brightness parameter. According to the first brightness parameter of the first backlight brightness, and a relationship between the first brightness parameter of the first backlight brightness and a second brightness parameter of the second backlight brightness, the second brightness parameter of the second backlight brightness can be determined.

As such, the electronic device can control the second brightness parameter of the second backlight brightness in accordance with the change in the first brightness parameter of the first backlight brightness. Thus, a certain relationship between the backlight brightness in the first state and the backlight brightness in the second state can be ensured, so that the power consumption of the electronic device in both of the first state and the second state can be desirably controlled.

In addition, it is possible to avoid the problem that the backlight brightness power consumption is large in one state due to the possibility that a user has only adjusted another state and has forgotten to adjust the backlight brightness in the one state.

For example, one or more keys can be printed on a touchpad of an electronic device. The one or more keys are visible when the backlight is on, and are not visible when the backlight is off. Assuming that one user's vision is weak, and has a high requirement to the backlight brightness of the touchpad when the electronic device is in a working state. Correspondingly, the user may also have a high requirement to the backlight brightness of the touchpad when the electronic device is in a hibernating state.

By using the disclosed method described above in accordance with some embodiments, when the user adjusts the backlight brightness of the touchpad in the working state, the backlight brightness of the touchpad in the hibernating state can be automatically adjusted in accordance with the adjustment of the backlight brightness of the touchpad in the working state.

In this way, the backlight brightness adjustment operation of the touchpad in the hibernating state can be omitted. It is also possible to avoid the problem that the user cannot find a key on the touchpad when the electronic device is in the hibernating state when the user has forgotten to adjust the backlight brightness of the touchpad in the hibernating state.

Figure 7:
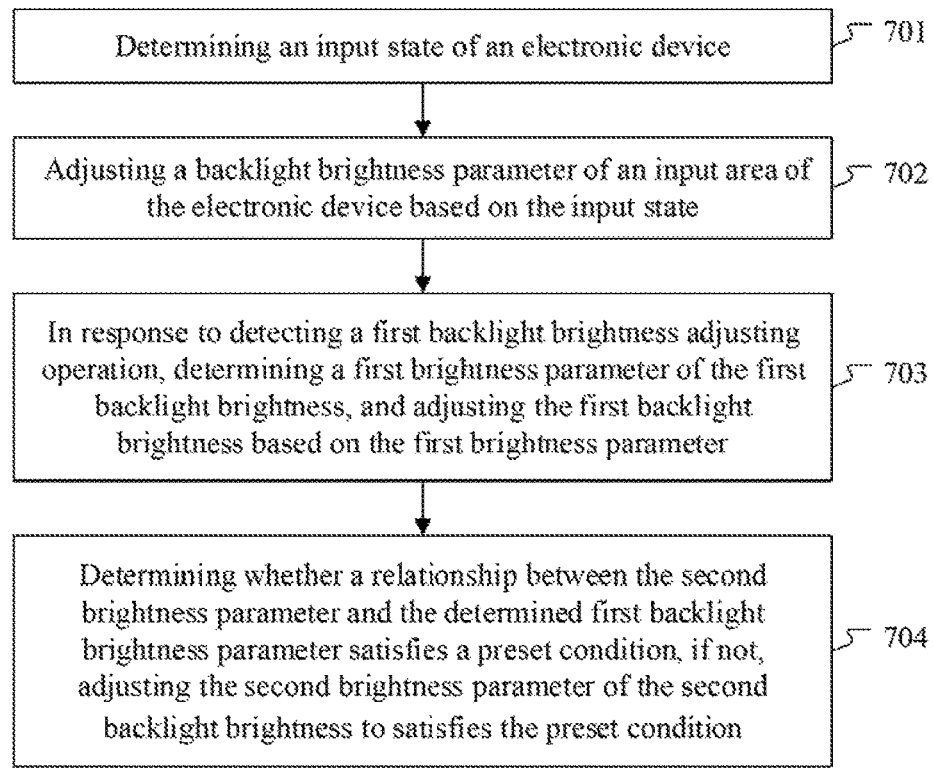
FIG. 7 illustrates a schematic flow diagram of another backlight control method in accordance with some other embodiments of the present disclosure.

Referring to FIG. 7, a schematic flow diagram of another backlight control method is shown in accordance with some other embodiments of the present disclosure. The disclosed backlight control method can be applied to an electronic device. As illustrated, the backlight control method can include the following steps.

At step 701, an input state of the electronic device can be determined.

At step 702, a backlight brightness parameter of an input area of the electronic device can be adjusted based on the input state.

At step 703, in response to detecting a first backlight brightness adjusting operation, a first brightness parameter of a first backlight brightness can be determined, and the first backlight brightness can be adjusted based on the first brightness parameter.

The first backlight brightness adjusting operation can be an operation for adjusting the first backlight brightness of the electronic device. For example, the first backlight brightness adjusting operation may be a mark dragging operation.

In some embodiments, the first backlight brightness characterizes a backlight the brightness when the electronic device is in a first state, and the second backlight brightness characterizes a backlight the brightness when the electronic device is in a second state. A power consumption of the electronic device in the first state can be different than a power consumption of the electronic device in the second state.

The first state and the second state can selected from the following group:
a working state, and a hibernating state. The hibernating state can include a sleep state.

For example, the first state can be a working state and the second state can be a hibernating state. Alternatively, the first state can be a hibernating state and the second state can be a working state.

At step 704, it can be determined whether a relationship between the second brightness parameter and the determined first backlight brightness parameter satisfies a preset condition. In response to determining that the relationship does not satisfy the preset condition, the second brightness parameter of the second backlight brightness can be adjusted, such that a relationship between the adjusted second brightness parameter and the determined first backlight brightness parameter satisfies the preset condition.

That is, in response to determining that the relationship between the second brightness parameter and the determined first backlight brightness parameter satisfies a preset condition, the second brightness parameter of the second backlight brightness can be maintained.

Optionally, the preset condition can be: in the first state and the second state, the backlight brightness parameter in one state is less than or equal to a preset ratio of the backlight brightness parameter in the other state.

Optionally, the preset condition can be: the backlight brightness parameter in the hibernating state is less than or equal to the preset ratio of the backlight brightness parameter in the working state.

In a particular embodiment, when the backlight brightness parameter in the working state is turned down, if the backlight brightness parameter on the backlight brightness adjustment bar for the working state is found to be less than the backlight brightness parameter on the backlight brightness adjustment bar for the hibernating state, the backlight brightness parameter on the backlight brightness adjustment bar for the hibernating state can be automatically adjusted.

As such, the backlight brightness parameter on the backlight brightness adjustment bar for the hibernating state can be equal to the backlight brightness parameter on the backlight brightness adjustment bar for the working state. Alternatively, the backlight brightness parameter on the backlight brightness adjustment bar for the hibernating state can be equal to 1/m of the backlight brightness parameter on the backlight brightness adjustment bar for the working state, and m can be greater than one.

When the backlight brightness parameter in the hibernating state is turned up, if the backlight brightness parameter on the backlight brightness adjustment bar for the hibernating state is found to be larger than the backlight brightness parameter on the backlight brightness adjustment bar for the working state, the backlight brightness parameter on the backlight brightness adjustment bar for the working state can be automatically adjusted.

As such, the backlight brightness parameter on the backlight brightness adjustment bar for the working state can be equal to the backlight brightness parameter on the backlight brightness adjustment bar for the hibernating state, and a prompting message indicating that the backlight brightness parameter for the hibernating state cannot exceed the backlight brightness parameter for the working state can be presented. Alternatively, the backlight brightness parameter on the backlight brightness adjustment bar for the working state can be equal to p times of the backlight brightness parameter on the backlight brightness adjustment bar for the hibernating state, and p can be greater than one.

For example, the preset condition is that the backlight brightness parameter for the hibernating state is less than the backlight brightness parameter for the working state. The backlight brightness parameter has an adjustable range between 0 and 255. A current brightness parameter of the electronic device in the working state is 200, and a current brightness parameter of the electronic device in the hibernating state is 150. When the current brightness parameter of the electronic device in the working state is adjusted from 200 to 150, the electronic device can automatically adjust the current brightness parameter of the electronic device in the hibernating state to a value less than 150. When the current brightness parameter of the electronic device in the hibernating state is adjusted from 150 to 200, the electronic device can automatically adjust the current brightness parameter of the electronic device in the working state to a value larger than 200.

In some embodiments, the method can further include displaying a backlight brightness preview interface to present the adjusted backlight brightness in real time based on the backlight brightness parameters.

As such, the user can visually feel the adjusted backlight brightness, so that the adjusted backlight brightness can be used as a basis to determine a further action, such as keeping the current adjustment results, or continuing the backlight brightness adjustment.

In some embodiments, the method can further include, in response to detecting a second operation or the determining that a second preset condition is satisfied, recording the first brightness parameter and the second brightness parameter shown in the backlight brightness preview interface.

The second operation can be an operation for confirming that the currently highlighted backlight brightness shown in the backlight brightness preview interface is to be applied.

The second preset condition can be that a preview state continues for a first preset time threshold, and no operation is received within a second preset time.

In a specific embodiment, when the mark on the first adjustment bar is dragged, only the backlight brightness in the first state is previewed, and the first brightness parameter corresponding to the first state in the database is not changed. Similarly, when the mark on the second adjustment bar is dragged, only the backlight brightness in the second state is previewed, and the second brightness parameter corresponding to the second state in the database is not changed.

In response to receiving an operation for confirming that the currently highlighted backlight brightness shown in the backlight brightness preview interface is to be applied, the first brightness parameter corresponding to the first state and the second brightness parameter corresponding to the second state can be saved to the database.

In some embodiments, the method can further include, in response to detecting a third operation for instructing to discard the currently backlight brightness in the backlight brightness preview interface, determining the first brightness parameter and the second brightness parameter before the preview, and adjusting the current backlight brightness is to the backlight brightness before the preview based on the first brightness parameter and the second brightness parameter before the preview.

That is, when the operation of discarding the currently backlight brightness in the backlight brightness preview interface is received, the backlight brightness in the first state and the backlight brightness in the second state are discarded, and the backlight brightness before the preview can be maintained.

Accordingly, in some embodiments, in response to detecting a first backlight brightness adjusting operation, a first brightness parameter of a first backlight brightness can be determined, and the first backlight brightness can be adjusted based on the first brightness parameter. It can be determined whether a relationship between the second brightness parameter and the determined first backlight brightness parameter satisfies a preset condition. In response to determining that such relationship does not satisfy the preset condition, the second brightness parameter of the second backlight brightness can be adjusted, such that a relationship between the adjusted second brightness parameter and the determined first backlight brightness parameter satisfies a preset condition.

In this way, the electronic device can control the relationship between the second brightness parameter of the second backlight brightness and the first brightness parameter of the first backlight brightness, thereby ensuring a certain relationship between the backlight brightness in the first state and the backlight brightness in the second state. As such, the power consumptions of the electronic device in the first state and the second state do not violate an energy consumption rule. Normally, the energy consumption rule is that the backlight brightness in the hibernating state is less than the backlight brightness in the working state. In addition, it is also possible to avoid the problem that the working state and the hibernating state of the electronic device cannot be identified by the user due to that the backlight brightness in one state has been arbitrarily adjusted.

For example, one or more keys can be printed on a touchpad of an electronic device. The one or more keys are visible when the backlight is on, and are not visible when the backlight is off. Generally, users may believe that the backlight brightness in the working state is greater than the backlight brightness in the hibernating state. By using the disclosed method described above in accordance with some embodiments, when the backlight brightness in the working state is turned down or the backlight brightness in the hibernating state is turned up, if the adjusted backlight brightness parameters do not meet the above preset condition, the backlight brightness parameters may be automatically adjusted to meet the general user's cognitive rule, and to avoid a misjudgment of the states of the electronic device when the user over adjusts the backlight brightness parameter in one state.

Figure 8:
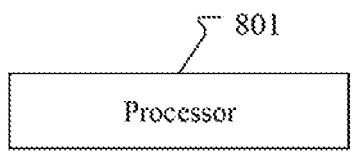
FIG. 8 illustrates a schematic structure diagram of an electronic device in accordance with some embodiments of the present disclosure.

Referring to FIG. 8, a schematic structure diagram of an electronic device is shown in accordance with some embodiments of the present disclosure.

As illustrated, the electronic device can include a processor 801 configured for determining an input state of the electronic device, and for adjusting a backlight brightness level of an input area of the electronic device based on the input state. The input area of the electronic device can have different backlight brightness corresponding to multiple input states.

Figure 9:
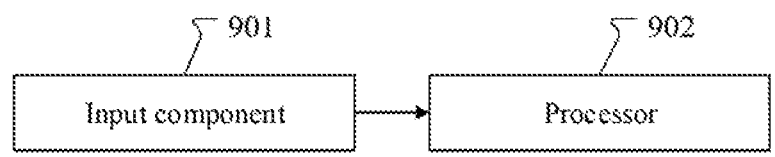
FIG. 9 illustrates a schematic structure diagram of another electronic device in accordance with some other embodiments of the present disclosure.

Referring to FIG. 9, a schematic structure diagram of another electronic device is shown in accordance with some other embodiments of the present disclosure.

As illustrated, the electronic device can include an input component 901, and a processor 902 configured for determining an input state of the input component, and adjusting a backlight brightness level of the input component based on the input state.

Specifically, the processor 902 may be a general purpose central processing unit (CPU), a specific application integrated circuit (IC), or one or more integrated circuits for controlling the execution of instructions and programs.

Further, the electronic device may further include one or more memories. The one or more memories may include a read only memory (ROM), a random access memory (RAM), and a disk memory.

Optionally, the input state can include an inputting state for receiving input information through the input component, an input-waiting state in which no input is received by the input component during a time period after receiving an input, and a non-inputting state in which the input component does not response to any user input.

Optionally, the processor 902 can be further configured for: in response to detecting a clicking operation or a handwriting operation to the input component, determining that the input component is in an inputting state; in response to determining that an operation area in a display interface of the electronic device is in an input-waiting state, determining that the input component is in an input-waiting state; and in response to determining that the input component is not responsible to a clicking operation nor a handwriting operation, determining that the input component is in an non-inputting state.

Optionally, the processor 902 can be further configured for: in response to determining that the input component is in an inputting state, adjusting the backlight brightness of the input component to an inputting brightness corresponding to the inputting state; and in response to determining that the input component is in an non-inputting state, adjusting the backlight brightness of the input component to an non-inputting brightness corresponding to the non-inputting state. In some embodiments, a luminance value of the inputting brightness can be larger than a luminance value of the non-inputting brightness.

Optionally, the processor 902 can be further configured for: in response to determining that the input component is in a first input state, adjusting the backlight brightness of the input component to a first brightness corresponding to the first input state; and in response to determining that the input component is in a second input state, adjusting the backlight brightness of the input component to a second brightness corresponding to the second input state. In some embodiments, the first input is a clicking-receiving state, the second input is handwriting-receiving, and a luminance value of the first brightness can be equal to or larger than a luminance value of the second brightness.

Optionally, the processor 902 can be further configured for: in response to receiving a user input operation through the input component within a first preset time range, determining that the input component is in the inputting state; in response to not receiving a user input operation through the input component within a second preset time range, determining that the input component is in a standby state; in response to determining the input component is in the inputting state, adjusting the backlight brightness of the input component to a working brightness corresponding to the inputting state; and in response to determining the input component is in the standby state, adjusting the backlight brightness of the input component to a standby brightness corresponding to the inputting state. In some embodiments, a luminance value of the working brightness can be larger than a luminance value of the standby brightness.

Optionally, the processor 902 can be further configured for: detecting whether a display screen of the electronic device is in a displaying state; in response to determining that the display screen of the electronic device is in the displaying state, determining the input state of the input component; and in response to determining that the display screen of the electronic device is not in the displaying state, adjusting the backlight brightness of the input component to a turned-off state.

Optionally, the processor 902 can be further configured for: determining the input state according to a relative positional relationship between the display screen of the electronic device and the input component.

The display screen of the electronic device is on a different surface from the input part. For example, for a notebook computer, the display screen is on a first surface, and the input component is on a second surface. The relative positional relationship between the display screen of the electronic device and the input component can be referred to a degree between the first surface and the second surface.

When the electronic device is used, the notebook computer is expanded from a closed state, and the angle between the first surface where the display screen is located and the second surface where the input component (e.g., a keyboard, a touchpad, an electromagnetic screen) is located can be gradually increased. The angle can be increased from 0 degree to an angle between 0 and 180 degrees. At this time, a user can face the display screen and tap the keyboard or handwrite/draw on the touchpad to input information. At this time, the input state of the input component can be in an inputting state or an input-waiting state. Correspondingly, the backlight of the input component can be turned on, or the backlight of the input component can be adjusted to be brighter.

When the angle between the first surface where the display screen is located and the second surface where the input component (e.g., a keyboard, a touchpad, an electromagnetic screen) is located can be greater than 180 degrees, such as 270 degrees, or 360 degrees, the user is likely using the display screen for viewing, such as watching a video or pictures, rather than using the input component (e.g., a keyboard, a touchpad, an electromagnetic screen) to input information, because at this time the second surface where the input component is located is facing downward. Thus, the input state of the input component can be in a non-inputting state. Correspondingly, the backlight of the input component can be turned off, or the backlight of the input component can be adjusted to be less bright.

The various embodiments and specific examples of the backlight brightness control method described above in connection with FIG. 2 are also applicable to the disclosed electronic device. It can be apparent to those skilled in the art that, the various embodiments of the implementations of the disclosed electronic device can be referred to the detailed descriptions of the backlight brightness control method. So for the sake of simplicity of the specification, the various embodiments of the implementations of the disclosed electronic device are no longer repeated here.

Accordingly, in some embodiments of the disclosed electronic device, the input state of the input component of the electronic device can be determined first, and the backlight brightness of the input component can be adjusted corresponding to the input state of the input component. As such, the backlight brightness of the input component can be automatically adjusted according to the input state of the input component. Therefore, the applicability of the electronic device can be improved, and the user's experience can be enhanced.

Further, the disclosed method described above can have the following advantages.

In some embodiments, the input component of the disclosed electronic device may have an inputting state for responding to a clicking operation or a handwriting operation to receive input information, an non-inputting state for ignoring a clicking operation and a handwriting operation to block input information, and an input-waiting state for waiting a character input, a graphical input, or any other form of signal input to the electronic device. As such, the applicability of the input component can be improved, and the intelligent parameter of electronic device can be enhanced.

Further, when the input component is in the inputting state, it is highly likely that the user is performing an information input operation through the input component, having a higher backlight luminance may facilitate the information input operation of the user. When the input component is in the non-inputting state, it is highly likely that the user is not performing an information input operation through the input component, having a lower backlight luminance or directly turning off the backlight of the input component may be advantageous for saving the energy consumption of the electronic device. Therefore, the disclosed method can improve the applicability of the electronic device, and can save energy as well.

Further, when a user is recognizing the keys or characters on the input component during a clicking operation, it is helpful to use a strong backlight brightness when the input device is in a clicking-receiving state. Therefore, the disclosed method can further improve the applicability of the electronic device, and enhance the user experience.

Further, in some embodiments, a backlight brightness parameter of the input component can be adjusted to have a larger luminance value when the user is inputting information through the input component, and a backlight brightness parameter of the input component can be adjusted to have a smaller luminance value when the user is not inputting information through the input component temporally. Therefore, the energy consumption of the electronic device can be further reduced.

Further, in some embodiment of the disclosed method, when the display screen of the electronic device is in the displaying state, the backlight of the input component can be adjusted according to the disclosed method. When the display screen of the electronic device is not in the displaying state, the backlight of the input component can be turned off. Therefore, the system resources can be saved, the processing efficiency of the electronic device can be improved, and the energy consumption of the system can be further reduced.

It should be understood by those skilled in the art that the described embodiments of the present disclosure may be provided as methods, systems, or computer program products. Accordingly, the present disclosure may include a complete hardware form, a complete software form, and a combination of software and hardware form. Moreover, the present disclosure may take the form of a computer program product implemented by one or more computer usable storage media including but not limited to disk storages, CD-ROM, optical memories, etc., in which computer usable program codes are included.

The present disclosure is described with reference to flowcharts and/or block diagrams of methods, apparatuses (systems), and computer program products according to various embodiments of the present disclosure. It should be note that each process and/or block in the flowcharts and/or block diagrams, as well as combinations of processes and/or blocks in flowcharts and/or block diagrams may be implemented by computer program instructions. Such computer program instructions may be provided to a processor of a general purpose computer, a dedicated computer, an embedded processor, or other programmable data processing device to generate a machine such that instructions generated by the processor of a computer or other programmable data processing devices can be used for realizing one or more functions specified in one or more processes and/or blocks in the flowcharts and/or block diagrams.

These computer program instructions may also be stored in a computer readable memory capable of operating a computer or other programmable data processing device in a particular manner such that instructions stored in the computer readable memory produce a product that includes a command device for implementing the one or more functions specified in one or more processes and/or blocks in the flowcharts and/or block diagrams.

These computer program instructions may also be loaded onto a computer or other programmable data processing device such that a series of operational steps are performed on the computer or other programmable device to produce computer-implemented processes that are performed on the computer or other programmable device. The instructions provide series of operational steps for implementing the one or more functions specified in one or more processes and/or blocks in the flowcharts and/or block diagrams.

Specifically, the computer program instructions corresponding to the disclosed backlight control method in some embodiment may be stored on a storage medium such as an optical disk, a hard disk, a flash memory, etc. When the computer program instructions corresponding to the backlight control method in the storage medium are read or executed by an electronic device, the backlight control method can include the following steps.

An input state of the input component can be determined, and a backlight brightness parameter of the input component can be adjusted based on the input state.

Optionally, the input state can include an inputting state for receiving input information through the input component, an input-waiting state in which no input is received by the input component during a time period after receiving an input, and a non-inputting state in which the input component does not response to any user input.

Optionally, the backlight control method corresponding to the executed computer program instructions can further include: in response to detecting a clicking operation or a handwriting operation to the input component, determining that the input component is in an inputting state; in response to determining that an operation area in a display interface of the electronic device is in an input-waiting state, determining that the input component is in an input-waiting state; and in response to determining that the input component is not responsible to a clicking operation nor a handwriting operation, determining that the input component is in an non-inputting state.

Optionally, the backlight control method corresponding to the executed computer program instructions can further include: in response to determining that the input component is in an inputting state, adjusting the backlight brightness of the input component to an inputting brightness corresponding to the inputting state; and in response to determining that the input component is in an non-inputting state, adjusting the backlight brightness of the input component to an non-inputting brightness corresponding to the non-inputting state. In some embodiments, a luminance value of the inputting brightness can be larger than a luminance value of the non-inputting brightness.

Optionally, the backlight control method corresponding to the executed computer program instructions can further include: in response to determining that the input component is in a clicking-receiving state, adjusting the backlight brightness of the input component to a first brightness corresponding to the clicking-receiving state; and in response to determining that the input component is in a handwriting-receiving state, adjusting the backlight brightness of the input component to a second brightness corresponding to the handwriting-receiving state. In some embodiments, a luminance value of the first brightness can be equal to or larger than a luminance value of the second brightness.

Optionally, the backlight control method corresponding to the executed computer program instructions can further include: in response to receiving a user input operation through the input component within a first preset time range, determining that the input component is in the inputting state; in response to not receiving a user input operation through the input component within a second preset time range, determining that the input component is in a standby state; in response to determining the input component is in the inputting state, adjusting the backlight brightness of the input component to a working brightness corresponding to the inputting state; and in response to determining the input component is in the standby state, adjusting the backlight brightness of the input component to a standby brightness corresponding to the inputting state. In some embodiments, a luminance value of the working brightness can be larger than a luminance value of the standby brightness.

Optionally, the backlight control method corresponding to the executed computer program instructions can further include: detecting whether a display screen of the electronic device is in a displaying state; in response to determining that the display screen of the electronic device is in the displaying state, determining the input state of the input component; and in response to determining that the display screen of the electronic device is not in the displaying state, adjusting the backlight brightness of the input component to a turned-off state.

Optionally, the backlight control method corresponding to the executed computer program instructions can further include: determining the input state according to a relative positional relationship between the display screen of the electronic device and the input component.

Figure 10:
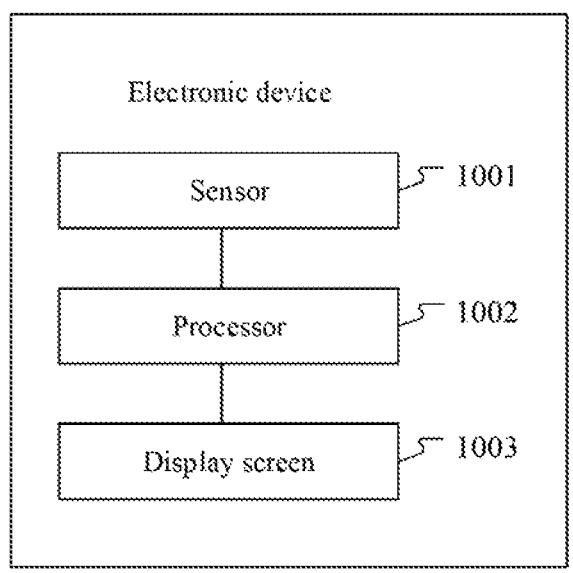
FIG. 10 illustrates a schematic structure diagram of another electronic device in accordance with some other embodiments of the present disclosure.

Referring to FIG. 10, a schematic structure diagram of another electronic device is shown in accordance with some other embodiments of the present disclosure.

As illustrated, the electronic device can include a sensor 1001 configured for detecting adjustment operation of a first backlight brightness.

The electronic device can further include a processor 1002 configured for: determining an input state of the electronic device; adjusting a backlight brightness parameter of the electronic device based on the input state; in response to detecting a first backlight brightness adjusting operation, determining a first brightness parameter of a first backlight brightness, and adjusting the first backlight brightness based on the first brightness parameter; and according to the first brightness parameter of the first backlight brightness, and a relationship between the first brightness parameter of the first backlight brightness and a second brightness parameter of the second backlight brightness, determining the second brightness parameter of the second backlight brightness.

In some embodiments, the first backlight brightness characterizes a backlight the brightness when the electronic device is in a first state, and the second backlight brightness characterizes a backlight the brightness when the electronic device is in a second state. A power consumption of the electronic device in the first state can be different than a power consumption of the electronic device in the second state.

The first state and the second state can be selected from the following group:
a working state, and a hibernating state.

The first brightness parameter can indicate the first backlight brightness of the electronic device in the working state, and the second brightness parameter can indicate the second backlight brightness of the electronic device in the hibernating state. Alternatively, the first brightness parameter can indicate the first backlight brightness of the electronic device in the hibernating state, and the second brightness parameter can indicate the second backlight brightness of the electronic device in the working state.

In some embodiments, the processor 1002 is further configured for adjusting the second brightness parameter of the second backlight brightness in accordance with the change of the first brightness parameter of the first backlight brightness.

In some embodiments, the processor 1002 is further configured for: determining whether a relationship between the second brightness parameter and the determined first backlight brightness parameter satisfies a preset relationship; in response to determining that the preset relationship is not satisfied, adaptively adjusting the second brightness parameter such that a relationship between the adjusted second brightness parameter and the determined first backlight brightness parameter satisfies the preset relationship.

Optionally, the preset condition can be: in the first state and the second state, the backlight brightness parameter in one state is less than or equal to a preset ratio of the backlight brightness parameter in the other state.

Optionally, the backlight brightness can be a backlight brightness level of the input area of the electronic device.

Optionally, the backlight brightness can be a keyboard backlight brightness level of the electronic device.

In some embodiments, the electronic device can further include a display screen 1003 for displaying a backlight brightness adjustment interface.

The backlight brightness adjustment interface can include at least a first adjustment bar and a second adjustment bar. The first adjustment bar can correspond to the first backlight brightness of the electronic device in the first state, the second adjustment bar can correspond to the second backlight brightness of the electronic device in the second state. The adjustment of the first backlight brightness can be achieved by dragging a mark on the first adjustment bar, and the adjustment of the second backlight brightness can be achieved by dragging a mark on the second adjustment bar.

It should be understood by those skilled in the art that, the functions of the processing modules in the electronic device in various embodiments can be understood by referring to the related descriptions of the backlight brightness adjustment method described above. The processing modules in the electronic device according to various embodiments can be realized by analog circuits that can realize the functions described in the embodiments, or can be realized by executing a software that can realize the functions described in the embodiments on the electronic device.

In some implementations, the processor 1002 may be realized by a central processing unit (CPU), a microprocessor (MCU), a digital signal processor (DSP), a digital signal processor (DSP), a programmable logic controller (PLC), and/or other suitable implementations.

Accordingly, the disclosed electronic device can automatically adjust the second backlight brightness based on the relationship between the second brightness parameter and the adjusted first brightness parameter. As such, it is not required for the user to manually adjust the second backlight brightness, thus simplifying the process of adjusting the backlight brightness, and enhancing the convenience of the backlight brightness function. At the same time, since the first backlight convenience and the second backlight convenience respectively represent the backlight convenience of the electronic apparatus in the first state and the second state, the second brightness parameter can be adaptively determined while adjusting the first brightness parameter. Therefore, the power consumption of electronic equipment can be reduced.

Figure 11:
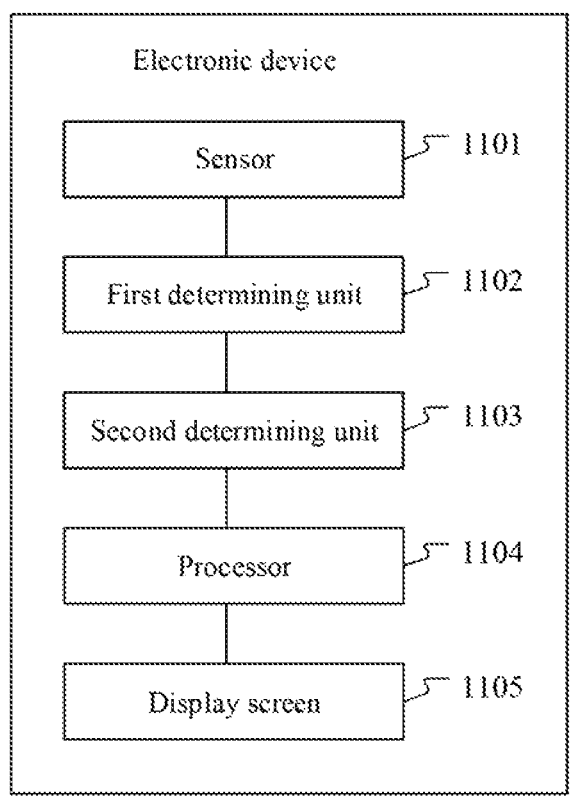
FIG. 11 illustrates a schematic structure diagram of another electronic device in accordance with some other embodiments of the present disclosure.

Referring to FIG. 11, a schematic structure diagram of another electronic device is shown in accordance with some other embodiments of the present disclosure.

As illustrated, the electronic device can include a sensor 1101 configured for detecting a first backlight brightness adjustment operation.

The electronic device can further include a first determining unit 1102 configured for: in response to detecting a first backlight brightness adjusting operation, determining a first brightness parameter of a first backlight brightness, and adjusting the first backlight brightness based on the first brightness parameter.

The electronic device can further include a second determining unit 1103 configured for: according to the first brightness parameter of the first backlight brightness, and a relationship between the first brightness parameter of the first backlight brightness and a second brightness parameter of the second backlight brightness, determining the second brightness parameter of the second backlight brightness.

The electronic device can further include a processor 1104 configured for: determining a state of the electronic device; adjusting a backlight brightness parameter of the electronic device based on the state.

In some embodiments, the state of the electronic device can include a first state and a second state. The first backlight brightness characterizes a backlight the brightness when the electronic device is in the first state, and the second backlight brightness characterizes a backlight the brightness when the electronic device is in the second state. A power consumption of the electronic device in the first state can be different than a power consumption of the electronic device in the second state.

The first state and the second state can selected from the following group:
a working state, and a hibernating state.

The first brightness parameter can indicate the first backlight brightness of the electronic device in the working state, and the second brightness parameter can indicate the second backlight brightness of the electronic device in the hibernating state. Alternatively, the first brightness parameter can indicate the first backlight brightness of the electronic device in the hibernating state, and the second brightness parameter can indicate the second backlight brightness of the electronic device in the working state.

In some embodiments, the second determining unit 1103 is further configured for adjusting the second brightness parameter of the second backlight brightness in accordance with the change of the first brightness parameter of the first backlight brightness.

In some embodiments, the second determining unit 1103 is further configured for: determining whether a relationship between the second brightness parameter and the determined first backlight brightness parameter satisfies a preset relationship; in response to determining that the preset relationship is not satisfied, adaptively adjusting the second brightness parameter such that a relationship between the adjusted second brightness parameter and the determined first backlight brightness parameter satisfies the preset relationship.

Optionally, the preset condition can be: in the first state and the second state, the backlight brightness parameter in one state is less than or equal to a preset ratio of the backlight brightness parameter in the other state.

Optionally, the backlight brightness can be a backlight brightness level of the input area of the electronic device.

Optionally, the backlight brightness can be a keyboard backlight brightness level of the electronic device.

In some embodiments, the electronic device can further includes a display screen 1105 for displaying a backlight brightness adjustment interface.

The backlight brightness adjustment interface can include at least a first adjustment bar and a second adjustment bar. The first adjustment bar can correspond to the first backlight brightness of the electronic device in the first state, the second adjustment bar can correspond to the second backlight brightness of the electronic device in the second state. The adjustment of the first backlight brightness can be achieved by dragging a mark on the first adjustment bar, and the adjustment of the second backlight brightness can be achieved by dragging a mark on the second adjustment bar.

It should be understood by those skilled in the art that, the functions of the processing modules in the electronic device in various embodiments can be understood by referring to the related descriptions of the backlight brightness adjustment method described above. The processing modules in the electronic device according to various embodiments can be realized by analog circuits that can realize the functions described in the embodiments, or can be realized by executing a software that can realize the functions described in the embodiments on the electronic device.

In some implementations, the first determining unit 1102 and the second determining unit 1103 may be realized by a central processing unit (CPU), a microprocessor (MCU), a digital signal processor (DSP), a digital signal processor (DSP), a programmable logic controller (PLC), and/or other suitable implementations. In some implementations, the sensor 1101 and the display screen 1105 may be implemented by a monitor or a display screen in the electronic device.

Accordingly, the disclosed electronic device can automatically adjust the second backlight brightness based on the relationship between the second brightness parameter and the adjusted first brightness parameter. As such, it is not required for the user to manually adjust the second backlight brightness, thus simplifying the process of adjusting the backlight brightness, and enhancing the convenience of the backlight brightness function. At the same time, since the first backlight convenience and the second backlight convenience respectively represent the backlight convenience of the electronic apparatus in the first state and the second state, the second brightness parameter can be adaptively determined while adjusting the first brightness parameter. Therefore, the power consumption of electronic equipment can be reduced.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a backlight control method and an electronic device are provided.

In some embodiments, the electronic device can include a primary screen and a secondary screen. The secondary screen can integrate a touchpad, a stylus electromagnetic screen, a handwriting switch, and other functional modules. One or more keys can be printed on the touchpad. The one or more keys can be visible when the backlight of the secondary screen is on, and can be invisible when the backlight of the secondary screen is off.

When the secondary screen is not in a touchpad mode, the backlight of the secondary screen can be turned off. When the secondary screen is in the touchpad mode, the backlight of the secondary screen can be can be adjusted according to a variety of conditions. For example, when the touchpad is currently used, the backlight can be set to a certain brightness value to ensure that the one or more keys are visible; when the touchpad does not receive any key-clicking action, the backlight can be dimmed in a timely manner to save power, when the electronic device is in a sleep mode, the backlight can be turned off.

In some embodiments, a method for adjusting the backlight of the secondary screen is provided. The method can include the following steps.

Firstly, a status of the primary screen of the electronic device can be determined. In response to determining that the primary screen is on, the backlight of the secondary screen can be turned off. In response to determining that the primary screen is off, an operating mode of the secondary screen can be determined.

In some embodiments, the operating mode of the secondary screen can be determined to be either a keyboard mode or a non-keyboard mode. In response to determining that the secondary screen is in the non-keyboard mode, the backlight of the secondary screen can be turned off. In response to determining that the secondary screen is in the keyboard mode, a working status of the keyboard on the secondary screen can be determined.

In some embodiments, the working status of the keyboard of the secondary screen can be either a working status or a hibernating status. In response to determining that the keyboard is in a hibernating status, the backlight of the secondary screen can be adjusted to a hibernating brightness level. In response to determining that the keyboard is in a working status, the backlight of the secondary screen can be adjusted to a working brightness level.

In some embodiments, the working status and the hibernating status of the keyboard of the secondary screen can be switched to each other. In one aspect, when a keyboard clicking operation or a handwriting operation is received, or a text edit box is clicked, the keyboard of the secondary screen can be switched from the hibernating status to the working status. Accordingly, the backlight of the secondary screen can be adjusted to a working brightness level.

As another example, a timer can be used to account a waiting time since the last operation to the keyboard of the secondary screen. If the waiting time is exceed to a hibernating time threshold, the keyboard of the secondary screen can be switched from the working status to the hibernating status. Accordingly, the backlight of the secondary screen can be adjusted to a hibernating brightness level.

In some embodiments, the working brightness level, the hibernating brightness level, and the hibernating time threshold can be preset by a user. Further, the working brightness level, the hibernating brightness level, and the hibernating time threshold can be reset anytime by the user. As such, before determining the operating mode of the secondary screen, it can be checked that whether one of the working brightness level, the hibernating brightness level, and the hibernating time threshold has been reset.

In some embodiments, one interface or a combination of multiple interface can be used to reset the working brightness level, the hibernating brightness level, and the hibernating time threshold. For example, a backlight adjustment interface can include two adjustment bars corresponding to the working brightness level and the hibernating brightness level respectively. When a mark on either of the two adjustment bars is dragged, the backlight brightness of the secondary screen of the corresponding status can be presented based on the position of the mark.

In some embodiments, the working brightness level can have a value between 1 and 255, and the hibernating brightness level can have a value between 0 and the current value of the working brightness level. Accordingly, when the working brightness level is adjusted to a value less than the value of the hibernating brightness level, the hibernating brightness level can be automatically adjusted to be equal to the current value of the working brightness level. Similarly, when the hibernating brightness level is adjusted to a value larger than the value of the working brightness level, the hibernating brightness level can be automatically adjusted to be equal to the current value of the working brightness level. Further, a prompt message can be presented to the user that the hibernating brightness level cannot exceed to the working brightness level.

In some embodiments, when a mark on either of the two adjustment bars is dragged to a new position, the corresponding hibernating brightness level or the working brightness level is merely presented for preview. When a confirm button in the backlight adjustment is clicked, the current values of the hibernating brightness level or the working brightness level can be saved. When a cancel button in the backlight adjustment is clicked, the previewed hibernating brightness level or the previewed working brightness level can be abandoned, and the save values of the hibernating brightness level and the working brightness level can be maintained.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A backlight control method, comprising:
   determining an input state of an electronic device which comprises an input area configured to input varied user data; and
   adjusting a backlight brightness parameter of the input area of the electronic device according to the input state of the electronic device, wherein the backlight brightness parameter of the input area of the electronic device is adjusted from a plurality of backlight luminance values that indicate a plurality of backlight brightness levels of the input area, and adjusting the backlight brightness parameter of the input area of the electronic device according to the input state includes:
      in response to determining the input state is a first input state, adjusting the backlight brightness parameter of the input area to a first backlight luminance value corresponding to the first input state, the input area in the first input state responding to a clicking operation within the input area; and
      in response to determining the input state is a second input state, adjusting the backlight brightness parameter of the input area to a second backlight luminance value corresponding to the second input state, the input area in the second input state responding to a handwriting operation within the input area;
   wherein a power consumption of the electronic device in the first input state is different from a power consumption of the electronic device in the second input state.

2. The backlight control method of claim 1, wherein:
   the input area and a display screen of the electronic device are located at different regions of the of the electronic device.

3. The backlight control method of claim 1, wherein:
the input area includes a keyboard; and
the backlight brightness parameter indicates a backlight brightness level of at least one key mark on the keyboard of the electronic device.

4. The backlight control method of claim 1, wherein:
the input state includes at least one of an inputting state, an input-waiting state, and a non-inputting state;
the inputting state indicates that the input area is receiving input information through a clicking operation or a handwriting operation;
the input-waiting state indicates that the input area is waiting for input information;
the non-inputting state indicates that the input area does not respond to a clicking operation or a handwriting operation through the input area;
a backlight brightness level corresponding to the inputting state is not less than a backlight brightness level corresponding to the input-waiting state; and
a backlight brightness level corresponding to the non-inputting state is less than the backlight brightness level corresponding to the input-waiting state and the backlight brightness level corresponding to the inputting state.

5. The backlight control method of claim 4, wherein:
in response to not receiving an input during a first time-range, the electronic device switches from the inputting state to the input-waiting state; and
in response to not receiving an input during a second time-range, or in response to receiving a preset operation, the electronic device switches from the input-waiting state to the non-inputting state.

6. The backlight control method of claim 1, further comprising:
in response to detecting an adjustment operation to a first backlight brightness parameter, adjusting the first backlight brightness parameter based on the adjustment operation; and
adjusting a second backlight brightness parameter based on the adjustment of the first backlight brightness parameter,
wherein the first backlight brightness parameter and the second backlight brightness parameter correspond to different input states respectively.

7. The backlight control method of claim 6, wherein:
the first backlight brightness parameter indicates a first backlight brightness level of the electronic device in a first input state;
the second backlight brightness parameter indicates a second backlight brightness level of the electronic device in a second input state; and
a power consumption of the electronic device in the first input state is different from a power consumption of the electronic device in the second input state.

8. The backlight control method of claim 6, further comprising:
displaying a backlight brightness adjustment interface;
wherein the backlight brightness adjustment interface includes at least a first adjustment bar corresponding to the first backlight brightness parameter and a second adjustment bar corresponding to the second backlight brightness parameter, adjustment to the first backlight brightness parameter being realized by a dragging operation of a mark on the first adjustment bar, and adjustment to the second backlight brightness parameter being realized by a dragging operation of a mark on the second adjustment bar.

9. The backlight control method of claim 1, further comprising:
determining a backlight brightness level of a display screen of the electronic device; and
determining a backlight brightness level of the input area of the electronic device;
wherein the input area and the display screen of the electronic device are located at different regions of the of the electronic device.

10. An electronic device, comprising:
an input component and a display screen, the input component and the display screen of being located at different regions of the of the electronic device; and
a processor coupled to the input component and the display screen, wherein the processor determines an input state of the electronic device which comprises an input area configured to input varied user data, and adjusts a backlight brightness parameter of the input area of the electronic device according to the input state, wherein the backlight brightness parameter of the input area of the electronic device is adjusted from a plurality of backlight luminance values that indicate a plurality of backlight brightness levels of the input area, and adjusting the backlight brightness parameter of the input area of the electronic device according to the input state includes:
in response to determining the input state is a first input state, adjusting the backlight brightness parameter of the input area to a first backlight luminance value corresponding to the first input state, the input area in the first input state responding to a clicking operation within the input area; and
in response to determining the input state is a second input state, adjusting the backlight brightness parameter of the input area to a second backlight luminance value corresponding to the second input state, the input area in the second input state responding to a handwriting operation within the input area;
wherein a power consumption of the electronic device in the first input state is different from a power consumption of the electronic device in the second input state.

11. The electronic device of claim 10, wherein:
the input component includes at least one of a keyboard, a touchpad, and an external input device detachable from the electronic device.

12. The electronic device of claim 10, wherein:
the input component includes a keyboard; and
the backlight brightness parameter indicates a backlight brightness level of at least one key mark on the keyboard of the electronic device.

13. The electronic device of claim 10, wherein:
the input component supports keyboard input and handwriting input by hand or accessory.

14. The electronic device of claim 10, wherein:
the input state includes at least one of an inputting state, an input-waiting state, and a non-inputting state;
the inputting state indicates that the input component is receiving input information through a clicking operation or a handwriting operation;
the input-waiting state indicates that the input component is waiting for input information;
the non-inputting state indicates that the input component does not respond to a clicking operation or a handwriting operation through the input area;

a backlight brightness level corresponding to the inputting state is not less than a backlight brightness level corresponding to the input-waiting state; and a backlight brightness level corresponding to the non-inputting state is less than the backlight brightness level corresponding to the input-waiting state and the backlight brightness level corresponding to the inputting state.

15. The electronic device of claim 10, wherein the processor further:

in response to detecting an adjustment operation to a first backlight brightness parameter, adjusts the first backlight brightness parameter based on the adjustment operation; and adjusts a second backlight brightness parameter based on the adjustment of the first backlight brightness parameter;

wherein the first backlight brightness parameter and the second backlight brightness parameter correspond to different input states respectively.

16. The electronic device of claim 15, wherein:

the first backlight brightness parameter indicates a first backlight brightness level of the electronic device in a first input state;

the second backlight brightness parameter indicates a second backlight brightness level of the electronic device in a second input state; and a power consumption of the electronic device in the first input state is different from a power consumption of the electronic device in the second input state.

17. The electronic device of claim 10, wherein the processor further:

determines a backlight brightness level of the display screen of the electronic device; and determines a backlight brightness level of the input component of the electronic device.

18. The electronic device of claim 10, wherein the processor further:

determines the input state according to a relative positional relationship between the input component and the display screen of the electronic device.

\* \* \* \* \*